(12) United States Patent
Komarla et al.

(10) Patent No.: US 7,353,339 B2
(45) Date of Patent: Apr. 1, 2008

(54) ADAPTIVE CACHING

(75) Inventors: Eshwari P. Komarla, Karnataka (IN); Vincent J. Zimmer, Federal Way, WA (US)

(73) Assignee: Intel Corporation, Santa Clara, CA (US)

(*) Notice: Subject to any disclaimer, the term of this patent is extended or adjusted under 35 U.S.C. 154(b) by 353 days.

(21) Appl. No.: 10/746,051

(22) Filed: Dec. 24, 2003

(65) Prior Publication Data

US 2005/0144394 A1 Jun. 30, 2005

(51) Int. Cl.
*G06F 12/02* (2006.01)
(52) U.S. Cl. .................. 711/137; 711/133; 711/158; 711/213
(58) Field of Classification Search .............. 711/158, 711/213, 133, 137
See application file for complete search history.

(56) References Cited

U.S. PATENT DOCUMENTS

| | | | |
|---|---|---|---|
| 5,734,854 A * | 3/1998 | Chan ........................ | 712/205 |
| 5,805,787 A * | 9/1998 | Brant et al. ............... | 714/6 |
| 6,219,760 B1 * | 4/2001 | McMinn ..................... | 711/137 |
| 6,385,641 B1 * | 5/2002 | Jiang et al. ................ | 709/203 |
| 6,442,653 B1 * | 8/2002 | Arimilli et al. ............ | 711/141 |
| 6,721,800 B1 * | 4/2004 | Basso et al. ............... | 709/239 |
| 6,928,518 B2 * | 8/2005 | Talagala ..................... | 711/135 |
| 6,947,756 B2 * | 9/2005 | Khan et al. ................ | 455/456.5 |
| 7,080,221 B1 * | 7/2006 | Todd et al. ................. | 711/161 |
| 2004/0006671 A1 * | 1/2004 | Handgen et al. ........... | 711/137 |

OTHER PUBLICATIONS

Niedermayer, Daryle. "An Introduction to Bayesian Networks and their Contemporary Applications". Dec. 1, 1998. pp. 1-14. www.niedermayer.ca/papers/bayesian/ (accessed on Feb. 9, 2006).*
I.D.I.S., "Bayesian Networks", [online], [Retrieved on Nov. 20, 2003], retrieved from the Internet at <URL: http://excalibur.brc.uconn.edu/~baynet/>.
Information Sciences Institute, "Internet Protocol", RFC 791, Sep. 1981, pp. i-iii & 1-45.
Information Sciences Institute, "Transmission Control Protocol", RFC 793, Sep. 1981, pp. i-iii & 1-85.
Institute of Electrical and Electronics Engineers, Inc. (IEEE), "IEEE Std 802.11b-1999", *Supplement to IEEE Standard for Information Technology*, Part 11, Mar. 8, 2002, pp. i-vii & 1-10.
Institute of Electrical and Electronics Engineers, Inc. (IEEE), "IEEE Std 802.3-2002", *IEEE Standard for Information Technology*, Part 3, Mar. 8, 2002, pp. 1-32.

(Continued)

*Primary Examiner*—Sanjiv Shah
*Assistant Examiner*—Jae Un Yu
(74) *Attorney, Agent, or Firm*—Konrad Raynes & Victor LLP; Janaki K. Davda

(57) ABSTRACT

Provided are techniques for cache management. An incoming request to access a first data block is received. A probability of how likely a second data block may be accessed based on the access of the first data block is determined. Whether the probability exceeds a read ahead threshold is determined. The second data block is prefetched in response to determining that the probability exceeds the read ahead threshold.

27 Claims, 16 Drawing Sheets

OTHER PUBLICATIONS

Intel Corporation, "Intel I/O Processors Overview", [online], [Retrieved on Nov. 20, 2003], retrieved from the Internet at <URL: http://www.intel.com/design/iio>.

ISBA, "Bayesian Statistics", [online], [Retrieved on Nov. 20, 2003], retrieved from the Internet at <URL: http://www.bayesian.org/bayesian/bayes.html>.

Krueger, M., R. Haagens, C. Sapuntzakis, & M. Bakke, "(iSCSI) Requirements and Design Considerations", RFC 3347, Jul. 2002, pp. 1-26.

Nefian, A.V., L.H. Liang, X.X. Liu, & X. Pi, "Video Interactivity: Audio-Visual Speech Recognition", [online], © 2003 Intel Corporation, [Retrieved on Nov. 20, 2003], retrieved from the Internet at <URL: http://www.intel.com/research/ mrl/research/avcsr.htm>.

PCI Special Interest Group, "Peripheral Component Interconnect (PCI) Bus Specification Order Form", [online], © 2004 PCI-SIG, Retrieved from the Internet at <URL: http://www,pcisig.com/specifications/order_form>.

PCT International Search Report and Written Opinion, Apr. 26, 2005, for International Application No. PCT/US2004/042756.

Penokie, G.O., "Information Technology—SCSI Controller Commands-2 (SCC-2)", *T10/Project 1225D*, Revision 4, Sep. 1997, pp. 1-8.

Satran, J., K. Meth, C. Sapuntzakis, M. Chadalapaka, & E. Zeidner, "iSCSI", Jan. 2003, pp. 1-238.

Serialata Workgroup, "Serial ATA: High Speed Serialized AT Attachment", Revision 1.0, Aug. 2001, pp. 1-36.

Shanley, T. and D. Anderson, "PCI System Architecture", Fourth Edition, © 1999 by Mindshare, Inc., pp. i-xliii & 1-21.

Tuah, N.J., M. Kumar, & S. Venkatesh, "Resource-aware Speculative Prefetching in Wireless Networks", *Wireless Networks 9*, Jan. 2003, pp. 61-72.

Weber, R., M. Rajagopal, F. Travostino, M. O'Donnell, C. Monia, & M. Merhar, "FC Frame Encapsulation", RFC 3643, Dec. 2003, pp. 1-20.

International Preliminary Report on Patentability (IPRP), Jul. 6, 2006, for International Application No. PCT/US2004/042756.

EP Office Action, Sep. 25, 2007, for European Application No. 04814890.2-1229.

\* cited by examiner $$P(\theta) = P(\theta_1,\ldots,\theta_p)$$

$$= \int P(\gamma) \prod_{K=1}^{P} P(\theta_k|\gamma)d\gamma$$

$$P(x^{(n+1)}|x^{(1)},\ldots,x^{(n)})$$

$$= \int P(x^{(n+1)}|\theta)P(\theta|x^{(1)},\ldots,x^{(n)})d\theta$$

FIG. 3

| Write Disk | Cache Block Offset | Number of Blocks | Last Accessed | Initiator Dist | Data |
|---|---|---|---|---|---|
| 4 | 500 | 650 | 10/5/2001 12:33 | 50 | Block[500]..Block[1150] |
| 2 | 18228 | 24 | 10/5/2001 1:31 | 228 | Block[18228]..Block[18232] |

FIG. 6A

| Read Disk | Cache Block Offset | Number of Blocks | Last Accessed | Initiator Dist | Number of Hits | Data |
|---|---|---|---|---|---|---|
| 4 | 1500 | 50 | NULL | NULL | 0 | Block[1500]..Block[1550] |

FIG. 6B

ADAPTIVE CACHING

BACKGROUND

1. Field

The disclosure relates to techniques for adaptive caching.

2. Description of the Related Art

Network attached storage (NAS) devices have several contributors of delay. These delays include network routers and subnets. These delays are coupled with the traditional delays associated with different access pattern distributions and locality in any storage system.

Conventional storage platforms use First-Come First Serve (FCFS) techniques for processing network requests. Occasionally, elevator scheduling is used by the I/O processor based on disk head positions to process I/O requests. That is, I/O requests for data blocks at the same disk head position are processed together.

Conventional I/O processors usually ignore the geometric distance across which I/O requests were received. Instead, conventional I/O processors are optimized only for throughput (I/O's per second).

Therefore, there is a need in the art for improved caching and I/O request processing techniques.

BRIEF DESCRIPTION OF THE DRAWINGS

Referring now to the drawings in which like reference numbers represent corresponding parts throughout:

FIG. 3 illustrates Bayes theorem in general form;

FIGS. 6A and 6B illustrate a non-volatile write cache and a volatile read cache in accordance with certain embodiments.

DETAILED DESCRIPTION OF THE EMBODIMENTS

In the following description, reference is made to the accompanying drawings which form a part hereof and which illustrate several embodiments. It is understood that other embodiments may be utilized and structural and operational changes may be made without departing from the scope of embodiments.

In certain embodiments, hardware, firmware, and/or software are provided to support adaptive caching techniques to normalize latency seen by network-attached computing devices (e.g., clients) and to learn access patterns for more efficient pre-fetching. Certain embodiments provide an I/O Processor (IOP) for performing adaptive caching.

Figure 1A:
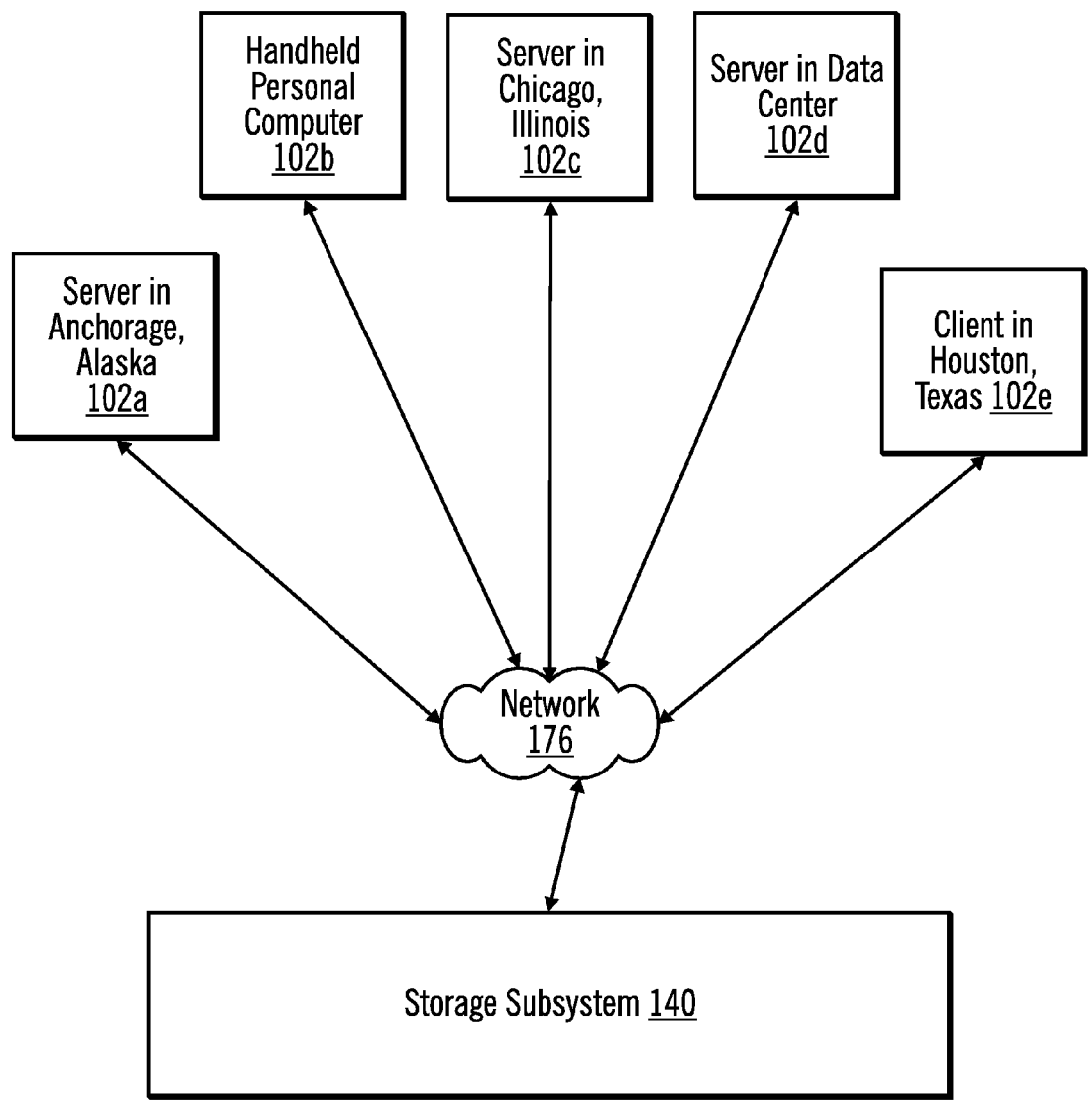
FIG. 1A illustrates a computing environment in which certain embodiments are implemented.

FIG. 1A illustrates a computing environment in which certain embodiments may be implemented. Various computing devices 102a, 102b, 102c, 102d, and 102e are connected via a network 176 to a storage subsystem 140. The computing devices may be, for example, a server in Anchorage, Ak. 102a, a handheld personal computer 102b, a server in Chicago, Ill. 102c, a server in a data center 102d, and a client in Houston, Tex. 102e. Network 176 may be, for example, a Local Area Network (LAN), the Internet, a Wide Area Network (WAN), Storage Area Network (SAN), WiFi (Institute of Electrical and Electronics Engineers (IEEE) 802.11b, published Sep. 16, 1999), Wireless LAN (IEEE 802.11b, published Sep. 16, 1999), etc. That is, the storage subsystem 140 is connected to network attached client and server computing devices 102a, 102b, 102c, 102d, and 102e issuing I/O requests.

Figure 1B:
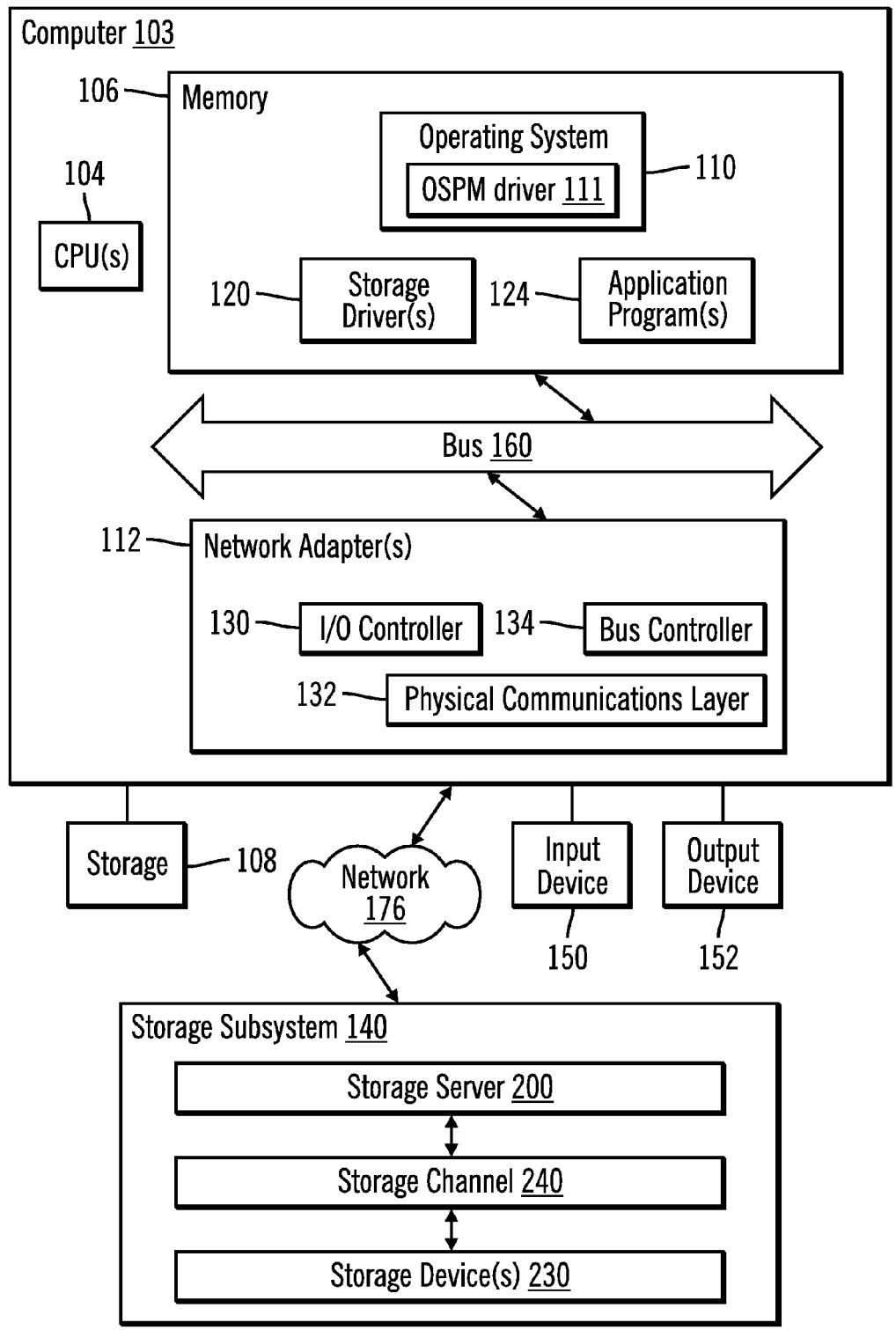
FIG. 1B illustrates further details of a computing environment in which certain embodiments may be implemented.

FIG. 1B illustrates further details of a computing environment in which certain embodiments may be implemented. A host computer 103 includes one or more central processing units (CPUs) 104, a volatile memory 106, non-volatile storage 108 (e.g., magnetic disk drives, optical disk drives, a tape drive, etc.), an operating system 110, and one or more network adapters 128. The operating system 110 may include operating system drivers, such as an Operating System Power Management (OSPM) driver 111. One or more storage drivers 120 and one or more application programs 124 further execute in memory 106 and are capable of transmitting and retrieving packets from remote storage subsystem 140 over the network 176.

The host computer 102e may comprise any computing device known in the art, such as a mainframe, server, personal computer, workstation, laptop, handheld computer, telephony device, network appliance, virtualization device, storage controller, etc. Computing devices 102a, 102b, 102c, 102d, and/or 102e may implement the architecture of host computer 104. Any CPU 104 and operating system 110 known in the art may be used. Programs and data in memory 106 may be swapped into storage 108 as part of memory management operations.

The storage subsystem 140 includes a storage server 200 (i.e., a type of computing device) connected to a storage channel 240, which is connected to one or more storage devices 230 (e.g., disk drives that are part of a Redundant Array of Independent Disks (RAID) system). Storage devices 230 may also be referred to as an I/O subsystem 230.

Each network adapter 128 includes various components implemented in the hardware of the network adapter 112. Each network adapter 112 is capable of transmitting and receiving packets of data over network 176.

Each storage driver 120 executes in memory 106 and includes network adapter 112 specific commands to communicate with each network adapter 112 and interface between the operating system 110 and each network adapter 112. Each network adapter 112 or storage driver 120 implements logic to process the packets, such as a transport protocol layer to process the content of messages included in the packets that are wrapped in a transport layer, such as Transmission Control Protocol (TCP) (Internet Engineering Task Force (IETF) Request for Comments (RFC) 793, published September 1981) and/or Internet Protocol (IP) (IETF RFC 791, published September 1981), the Internet Small Computer System Interface (iSCSI) (IETF RFC 3347, published February 2003), Fibre Channel (IETF RFC 3643, published December 2003) or any other transport layer protocol known in the art. The transport protocol layer unpacks the payload from the received Transmission Control Protocol/Internet Protocol (TCP/IP) packet and transfer the data to a storage driver 120 to return to the application program 124. Further, an application program 124 transmitting data transmits the data to a storage driver 120, which then sends the data to the transport protocol layer to package in a TCP/IP packet before transmitting over the network 176.

A bus controller 134 enables each network adapter 112 to communicate on a computer bus 160, which may comprise any bus interface known in the art, such as a Peripheral Component Interconnect (PCI) bus (PCI Special Interest Group, PCI Local Bus Specification, Rev 2.3, published March 2002), Small Computer System Interface (SCSI) (American National Standards Institute (ANSI) SCSI Controller Commands-2 (SCC-2) NCITS.318:1998), Serial ATA ((SATA 1.0a Specification, published Feb. 4, 2003), etc. The network adapter 112 includes a network protocol for implementing a physical communication layer 132 to send and receive network packets to and from remote data storages over a network 176. In certain embodiments, the network adapter 112 may implement the Ethernet protocol (IEEE std. 802.3, published Mar. 8, 2002), Fibre Channel (IETF RFC 3643, published December 2003), or any other network communication protocol known in the art.

The network adapter 112 includes an Input/Output (I/O) controller 130. In certain embodiments, the I/O controller 130 may comprise Internet Small Computer System Interface (iSCSI controllers), and it is understood that other types of network controllers, such as an Ethernet Media Access Controller (MAC) or Network Interface Controller (NIC), or cards may be used.

The storage 108 may comprise an internal storage device or an attached or network accessible storage. Programs in the storage 108 are loaded into the memory 106 and executed by the CPU 104. An input device 150 is used to provide user input to the CPU 104, and may include a keyboard, mouse, pen-stylus, microphone, touch sensitive display screen, or any other activation or input mechanism known in the art. An output device 152 is capable of rendering information transferred from the CPU 104, or other component, such as a display monitor, printer, storage, etc.

In certain embodiments, in addition to one or more storage drivers 120, the host computer 103 may include other drivers, such as a transport protocol driver (not shown) that performs the functions of the transport protocol layer.

The network adapter 112 may include additional hardware logic to perform additional operations to process received packets from the computer 103 or the network 176. Further, the network adapter 112 may implement a transport layer offload engine (TOE) to implement the transport protocol layer in the network adapter as opposed to the computer storage driver 120 to further reduce host computer processing burdens. Alternatively, the transport layer may be implemented in the storage driver 120.

Various structures and/or buffers (not shown) may reside in memory 106 or may be located in a storage unit separate from the memory 106 in certain embodiments.

Figure 2A:
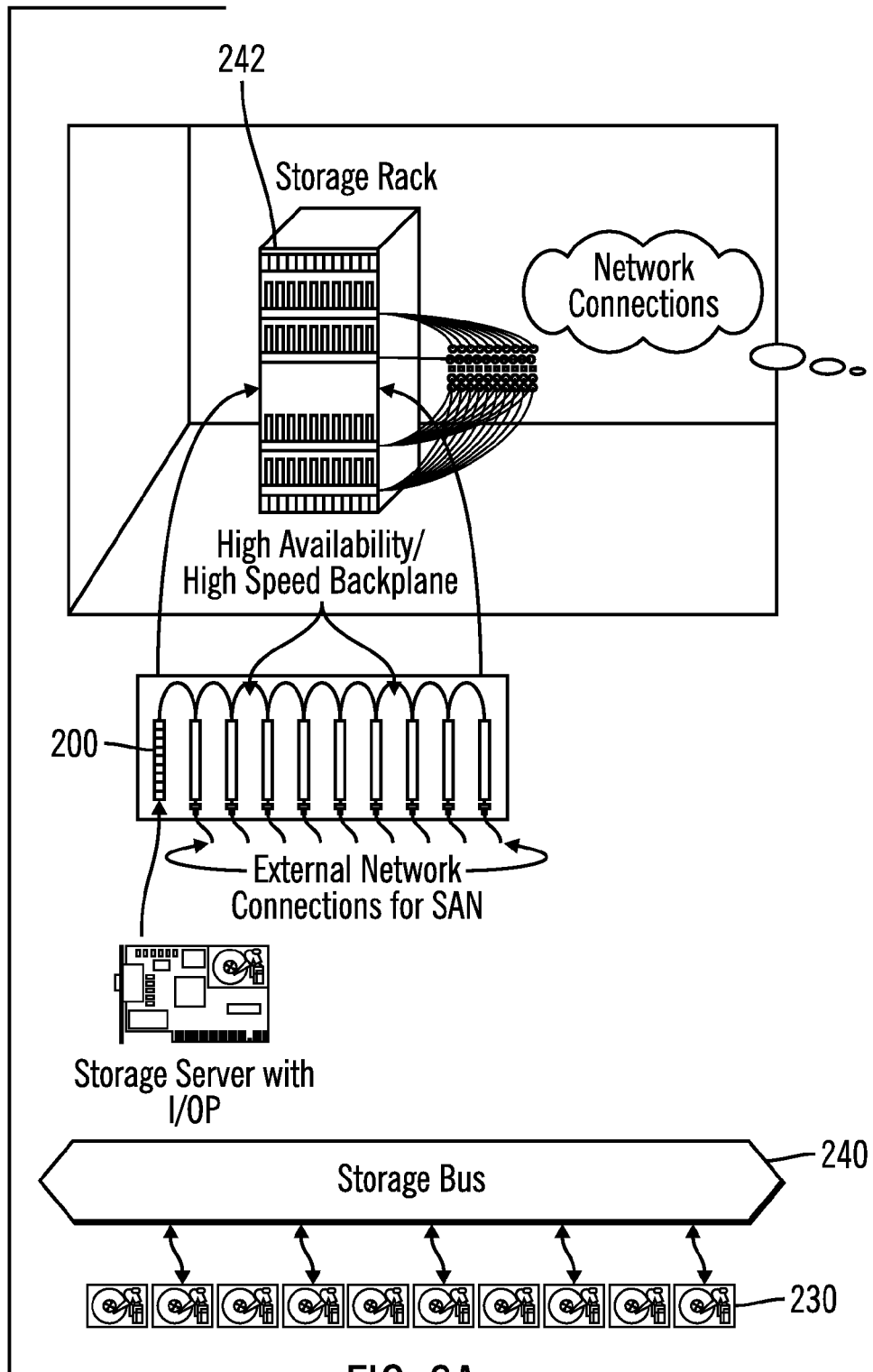
FIG. 2A illustrates a storage rack in accordance with certain embodiments.

FIG. 2A illustrates a storage rack 242 in accordance with certain embodiments. The storage rack 242 includes a high availability, high speed backplane for external network connections for servers on a Storage Area Network (SAN). One of the servers is a storage server 200 with an I/O processor that is connected to a storage bus (i.e., a type of storage connection 240), which is connected to storage devices 230. FIG. 2A provides an example of an enterprise storage topology with network-attached storage to demonstrate how certain embodiments may be extended into an enterprise domain that spans Storage Area Networks (SAN's) and storage servers with I/O processors.

Figure 2B:
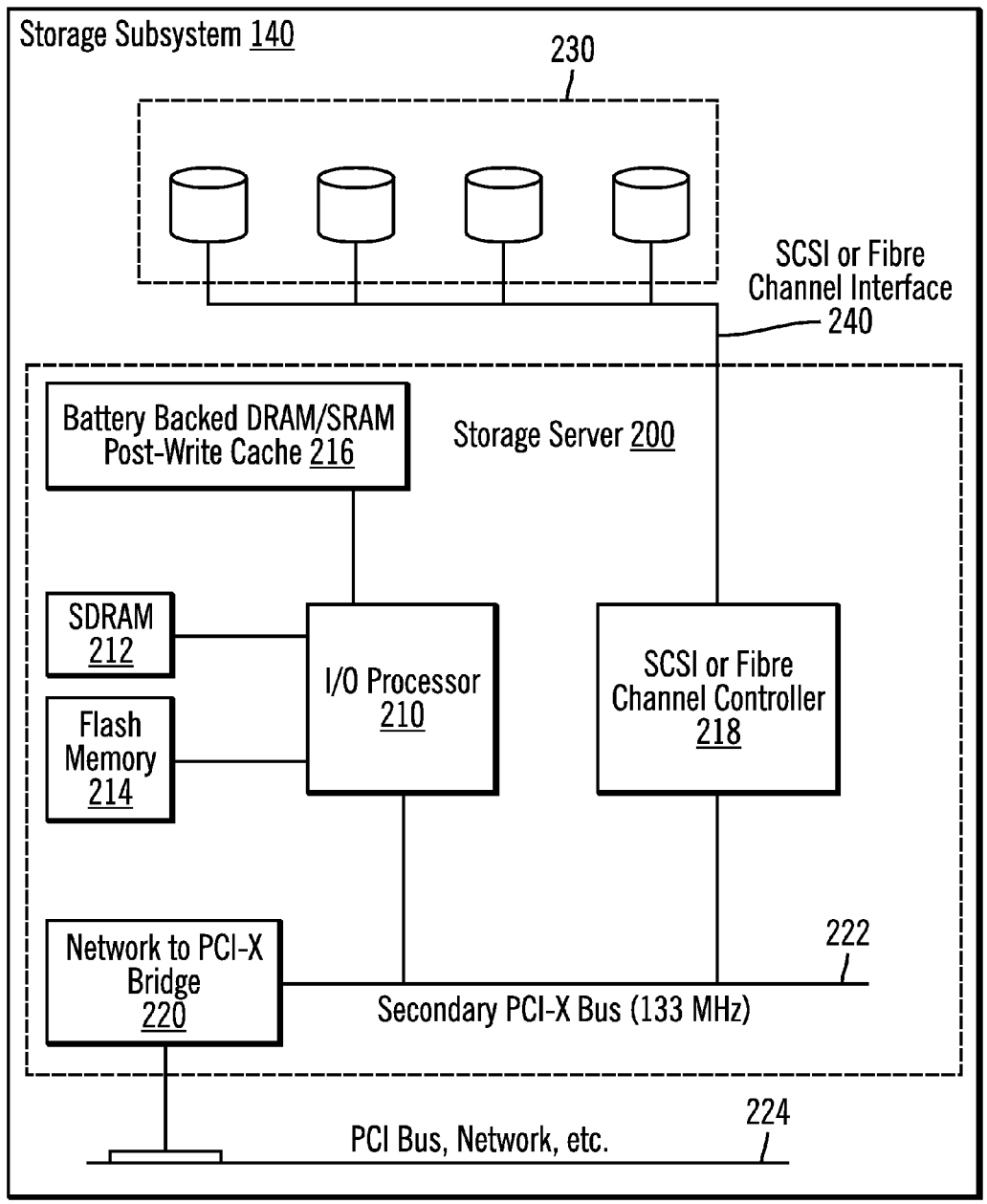
FIG. 2B illustrates further details of a storage subsystem in accordance with certain embodiments.

FIG. 2B illustrates further details of a storage subsystem 140 in accordance with certain embodiments. The storage subsystem 140 includes storage server 200, a Small Computer Systems Interface (SCSI) or Fibre channel interface (i.e., types of communication paths 240), and storage devices 230. The storage server 200 includes an I/O processor 210. Certain embodiments are implemented in an Intel® XScale™ I/O processor available from Intel Corporation. In certain embodiments, the I/O subsystem 230 is controlled by the I/O processor 210. In certain embodiments, the storage devices 230 may be described as a NAS unit. In certain embodiments, the I/O processor 210 may be resident on a motherboard of the storage server 200 or is part of a chipset. The I/O processor 210 is an intelligent processor with an operating environment specialized for storage (e.g., the I/O processor 210 includes firmware/software for applications such as RAID and iSCSI systems). The I/O processor 210 manages data transfer from the storage devices 130 to the host computer 103 CPU 140 and vice-versa. In certain embodiments, the I/O processor 210 is attached to a wide-area network (WAN), such as the Internet, and communicates with clients via an iSCSI protocol.

The storage server 200 also includes Synchronous Dynamic Random Access Memory (SDRAM) 212 and Flash memory 214 for use by the I/O processor 210. A section of memory (cache 216) managed by the I/O processor 210 is battery-backed, thus allowing for use as a post-write cache (i.e., for storing write transactions and acting as a buffer cache). Cache 216 may be, for example, Dynamic Random Access Memory (DRAM) or Static Random Access Memory (SRAM). A SCSI or Fibre channel controller 218 is used to connect to SCSI or Fibre channel interface 240. In certain embodiments, Integrated Drive Electronics (IDE) may be used instead of or in addition to channel controller 218. Also, a network to PCI-X bridge 220 is connected to the I/O processor 210 and channel controller 218 via a secondary PCI-X bus 222 (e.g., of 133 MHz) and is connected to a PCI bus, a network, host computer 103, etc. via communication path 224.

Figure 2C:
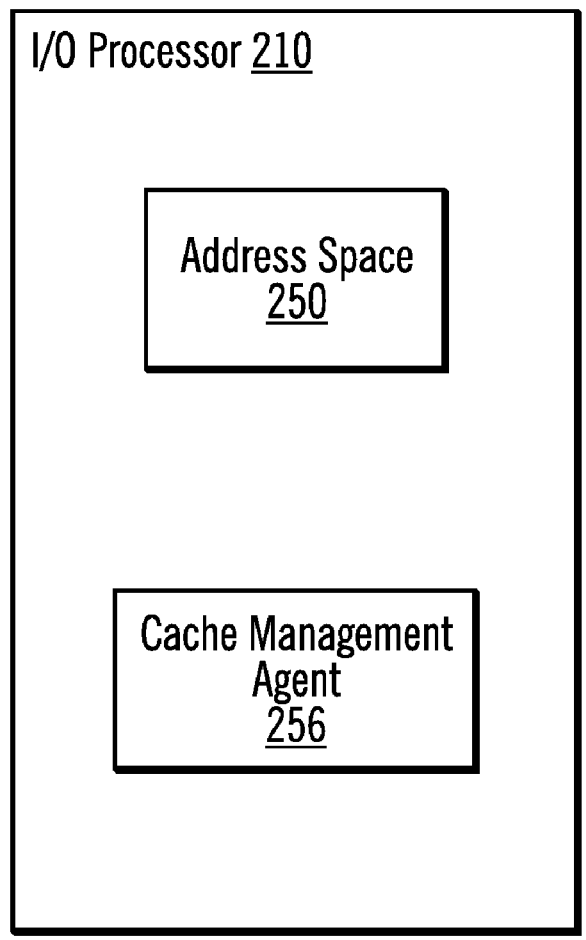
FIG. 2C illustrates further details of an I/O processor in accordance with certain embodiments.

FIG. 2C illustrates further details of an I/O processor 210 in accordance with certain embodiments. The I/O processor 210 includes address space 250 and cache management agent 256 to assist with managing the cache 216. In certain embodiments, the cache management agent 256 is implemented in firmware. In certain alternative embodiments, the cache management agent 256 may be implemented in software, hardware, or a combination of software, firmware, and/or hardware. For example, the computing device learning and computations of the cache management agent 256 may be implemented in silicon state machines.

Figure 2D:
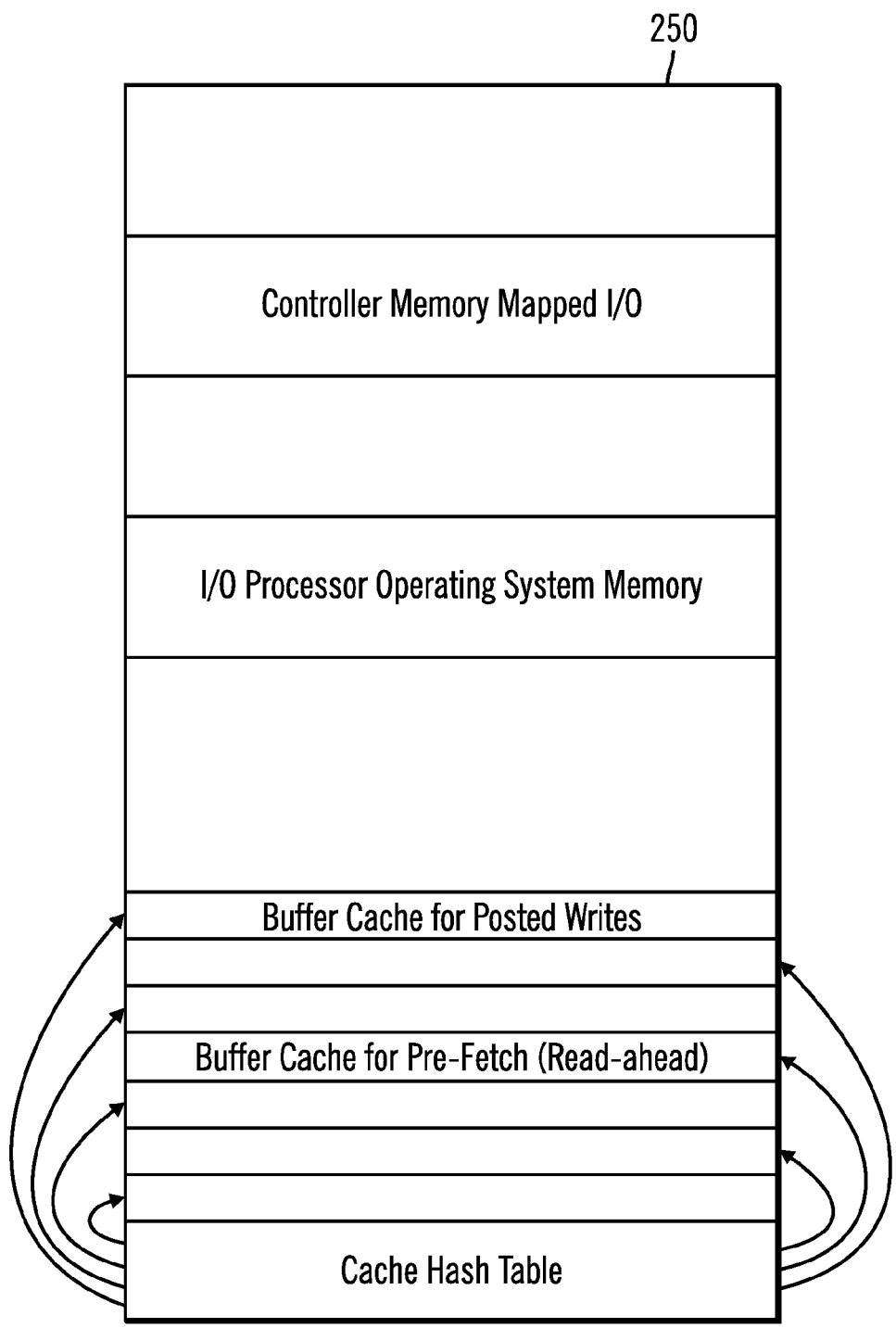
FIG. 2D illustrates further details of an address space usage for the I/O processor in accordance with certain embodiments.

FIG. 2D illustrates further details of an address space 250 usage for the I/O processor 210 in accordance with certain embodiments. The address space 250 includes controller memory mapped I/O for use by the channel controller 218, I/O processor operating system memory for use by the I/O processor 210, a buffer cache for posted writes for use by cache 216, a buffer cache for pre-fetch (i.e., for read-ahead), and a cache hash table.

FIG. 3 illustrates Bayes theorem in general form. Bayes theorem is a mathematical formula used for calculating conditional probabilities. Certain embodiments provide advanced Bayesian network techniques in the I/O processor 210. Certain embodiments reduce varying delays in storage subsystems by using Bayesian networks to learn about access patterns and priority queuing to give preference to clients with the largest network distance. In certain embodiments, the learning for the Bayesian Network is accomplished by monitoring the frequency of certain access patterns, using as the prior statistics the measured request frequency. The data for the client network distance may include tracking a hop-count in an Internet Protocol (IP) header, pinging a client and measuring the client response, and other techniques. A hop count is associated with a data packet and is incremented by each router that the data packet passes through.

Figure 4:
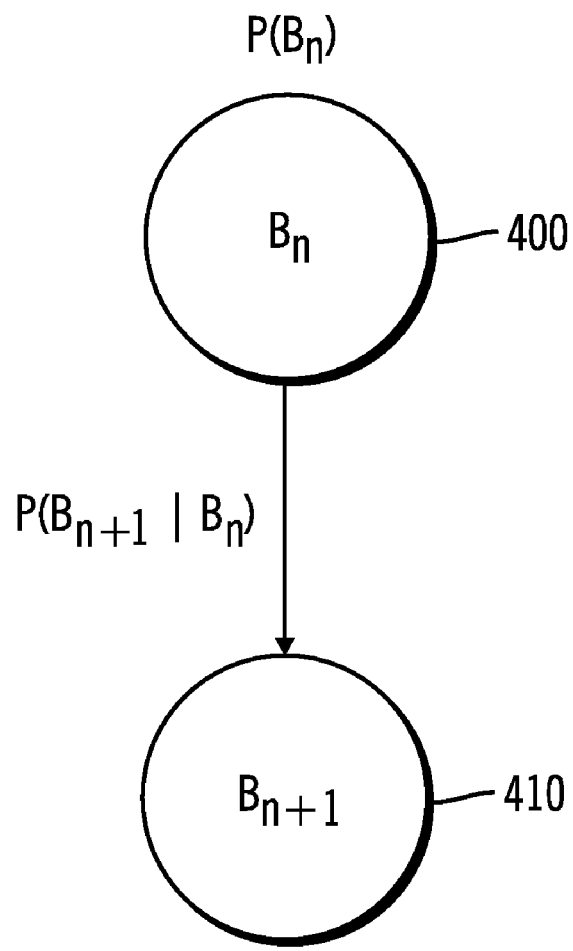
FIG. 4 illustrates calculation of probabilities in accordance with certain embodiments.

FIG. 4 illustrates calculation of probabilities in accordance with certain embodiments. For example, $P(B_{n+1}|B_n)$ represents the probability that Data Block$_{n+1}$ 410 may be accessed if Data Block$_n$ 400 is accessed, $(B_n)$. Merely for ease of reference, the term "Data Block" with a subscript is used herein to refer to a block of data. Certain embodiments use this probability analysis to determine whether to retrieve Data Block$_{n+1}$ 410 if Data Block$_n$ 400 is read or written. For example, if it is likely that Data Block$_{n+1}$ 410 may be accessed if Data Block$_n$ 400 were accessed, it is useful to retrieve Data Block$_{n+1}$ 410 to avoid a later I/O activity to retrieve Data Block$_{n+1}$ 410.

FIGS. 5A, 5B, 5C, 5D, and 5E illustrate operations for caching in accordance with certain embodiments. Control begins at block 500 with an agent being restarted and a platform being initialized. In certain embodiments, the agent is associated with a Real-Time Operating System upon which storage device (e.g., RAID) firmware executes. A platform may be described as the I/O processor 210 and associated firmware. In block 502, the cache management agent 256 determines whether this is the first boot. If so, processing continues to block 504, otherwise, processing continues to block 506. In block 504, the cache management agent 256 loads initial network probabilities and one or more cache tables from Flash memory 214 (e.g., a type of Read Only Memory (ROM)) into SDRAM 212. In block 506, the cache management agent 256 loads last used network probabilities and one or more cache tables (e.g., from ROM). The cache tables may include a write cache and a read cache.

FIGS. 6A and 6B illustrate a non-volatile write cache table 600 and a volatile read cache table 610 in accordance with certain embodiments. On startup, the read cache table 610 is typically empty, and the write cache table 600 may include contents that were not flushed to a storage device. The write cache table 600 may be a series of N-tuples for a multiple disk (e.g., 4 disk) configuration, with each tuple including a write disk identifier, a cache block offset, a number of blocks, a lass accessed date and time, an initiator distance, and data. The read cache table 610 may be a series of N-tuples for a multiple disk (e.g., 4 disk) configuration, with each tuple including a read disk identifier, a cache block offset, a number of blocks, a lass accessed date and time, an initiator distance, a number of hits, and data. In certain embodiments, the term blocks may be used to refer to sectors or 512 byte units. The initiator distance may be described as a normalized unit, such as a hop count and/or resultant value of a ping to an initiator computer. The write cache table 600 may be stored in cache 216, while the read cache table 610 may be stored in SDRAM 212.

In block 508, the cache management agent 256 determines whether there is an incoming request. If so, processing continues to block 512, otherwise processing continues to block 510. In block 510, idle processing, cache write back (i.e., writing data from cache 216 to a storage device 230), self-test, power-down, and other processing is performed.

Figure 5A:
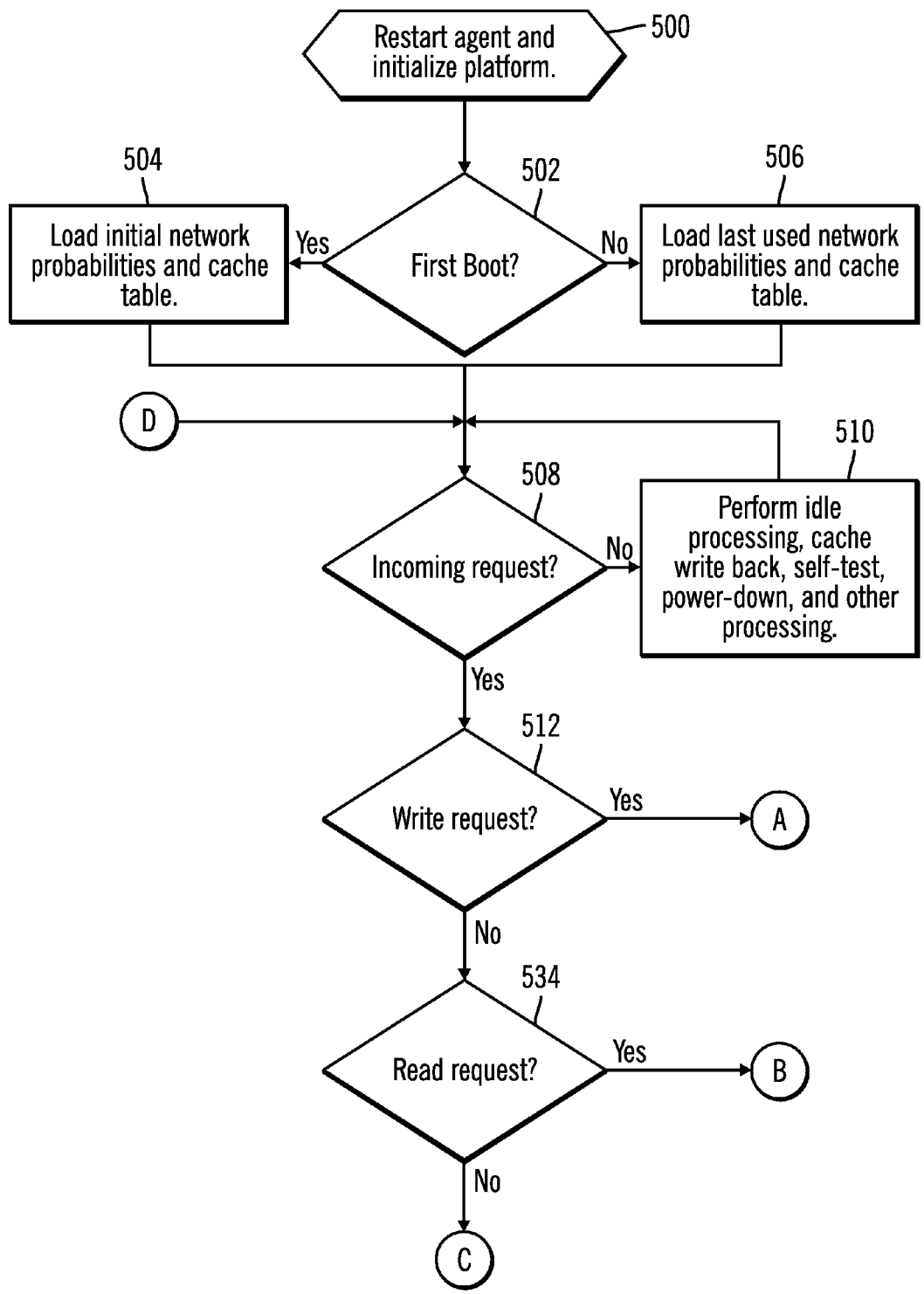
FIGS. 5A, 5B, 5C, 5D, and 5E illustrate operations for caching in accordance with certain embodiments.

In block 512, the cache management agent 256 determines whether the incoming request is a write request, if so, processing continues to block 514 (FIG. 5B), otherwise, processing continues to block 534. In block 534, the cache management agent 256 determines whether the incoming request is a read request. If so, processing continues to block 536 (FIG. 5C), otherwise, processing continues to block 566 (FIG. 5E).

Figure 5B:
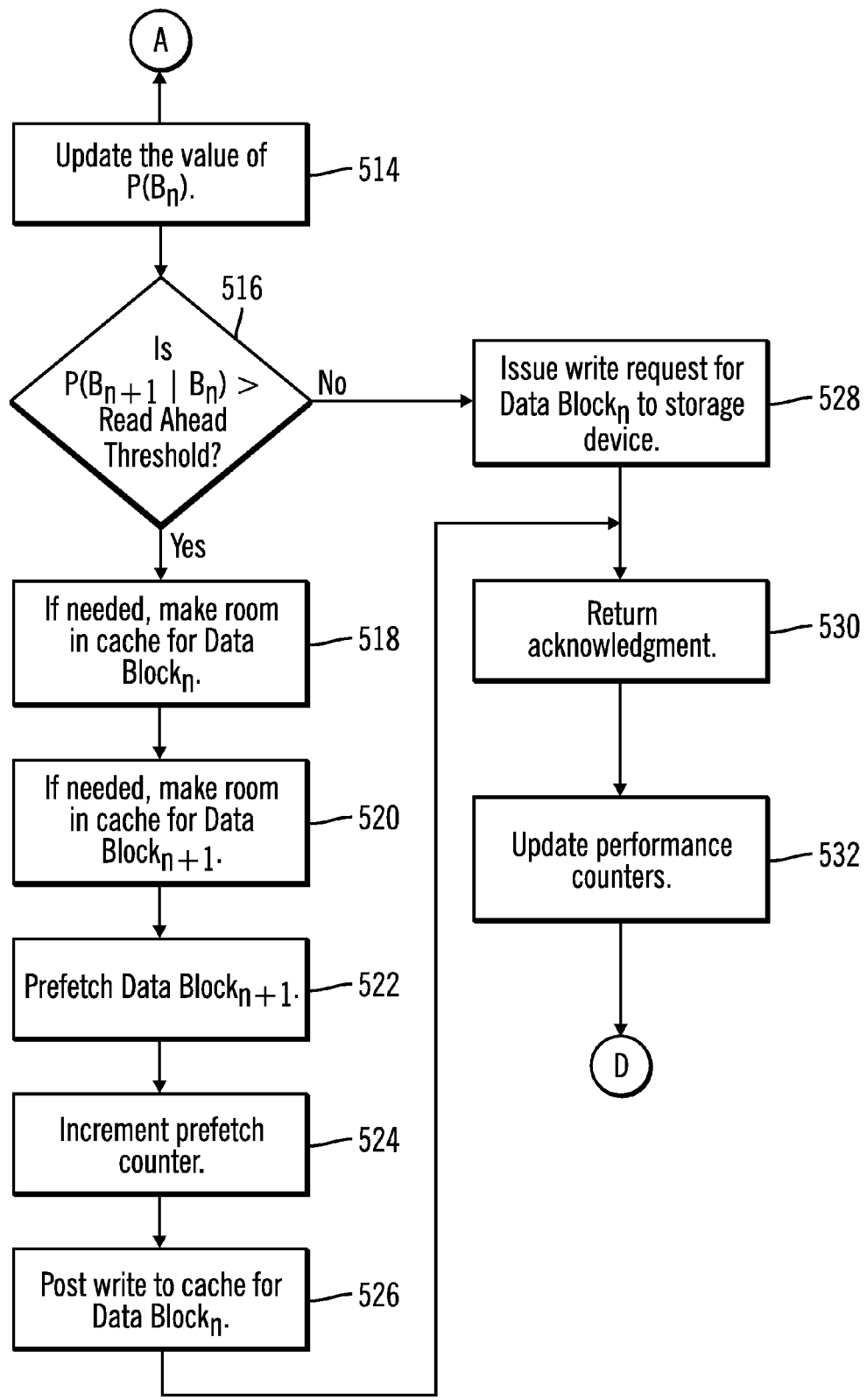

In FIG. 5B, a write request is processed. In block 514, the cache management agent 256 updates the value of $P(B_n)$ (i.e., the probability that Data Block$_n$ may be accessed out of all available blocks. For example, before any blocks have been accessed, if there 1,000,000 blocks, then, the probability that Data Block$_n$ may be accessed is 1/1,000,000. However, if Data Block$_n$ has been accessed 1,000 times, the probability that Data Block$_n$ may be accessed is 1/1000.

In block 516, the cache management agent 256 determines whether the probability that Data Block$_{n+1}$ may be accessed because Data Block$_n$ was accessed (i.e., $P(B_{n+1}|B_n)$) is greater than a read ahead threshold. A read ahead threshold is used to determine whether read ahead should be performed. If so, processing continues to block 518, otherwise, processing continues to block 528.

In block 518, the cache management agent 256 makes room in cache 216, if needed (See FIG. 6), for Data Block$_n$. In block 520, the cache management agent 256 makes room in cache 216, if needed (See FIG. 6), for Data Block$_{n+1}$. In block 522, the cache management agent 256 prefetches Data Block$_{n+1}$. In block 524, the cache management agent 256 increments a prefetch counter. In block 526, the cache management agent 256 post writes Data Blockn to cache. The term post write refers to writing a block to cache 216, committing the write to a storage device 230, and later writing the block from cache 216 to the storage device 230. A client, however, believes that the write is complete upon the commit and is not aware of the latency in writing the block from cache 216 to the storage device 230. From block 526, processing continues to block 530.

In block 528, if the probability that Data Block$_{n+1}$ may be accessed because Data Block$_n$ was accessed (i.e., $P(B_{n+1}|B_n)$) is not greater than a read ahead threshold, the cache management agent 256 issues a write request for Data Block$_n$ to a storage device 230.

In block 530, the cache management agent 256 returns an acknowledgement. In block 532, the cache management agent 256 updates performance counters, such as number of reads, number of writes, number of prefetches (i.e., for the prefetch counter), and number of hits to cache (i.e., for a prefetch success counter). The performance counters may be described as general statistics for traffic.

Figure 5C:
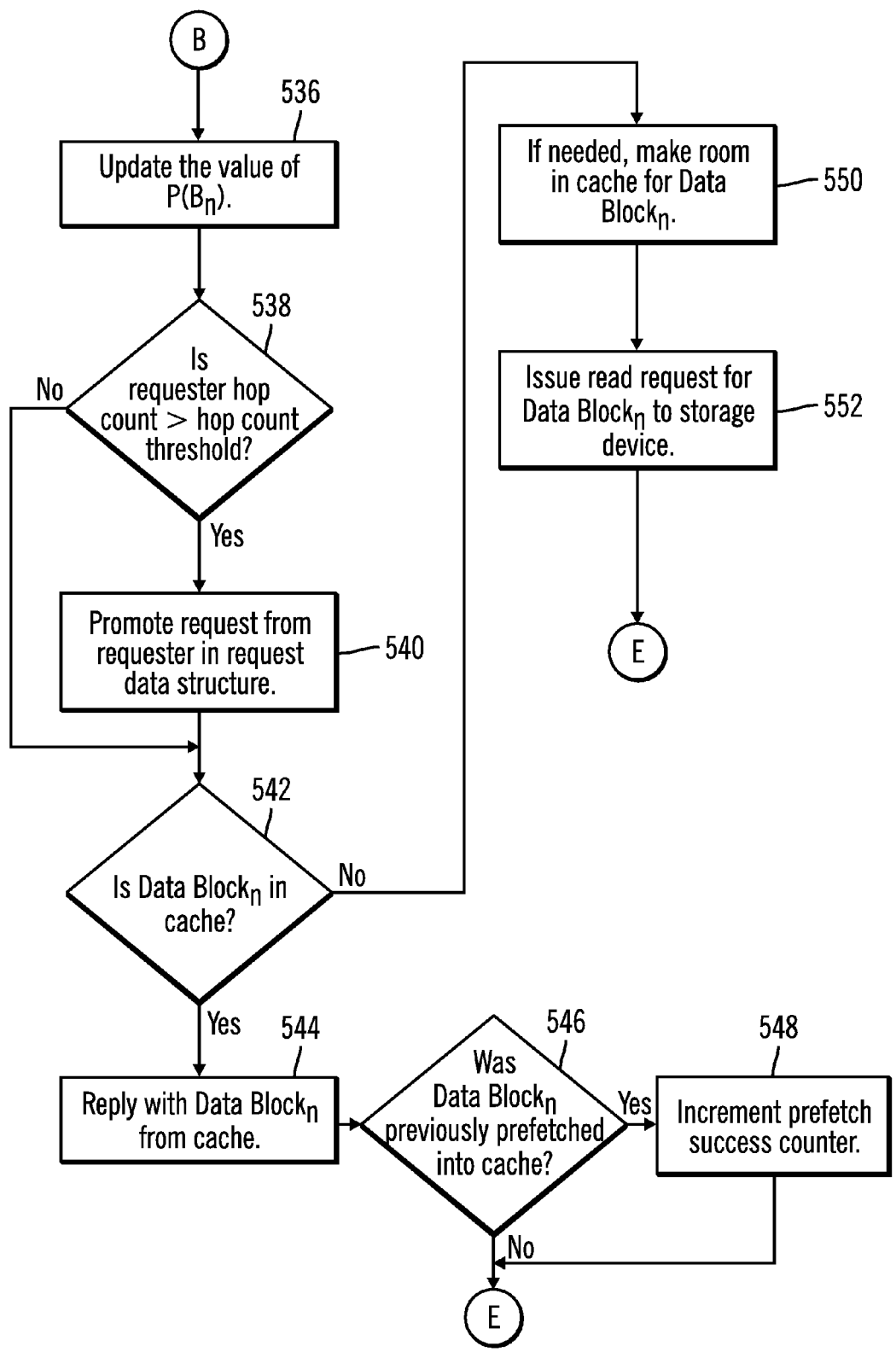
Figure 5D:
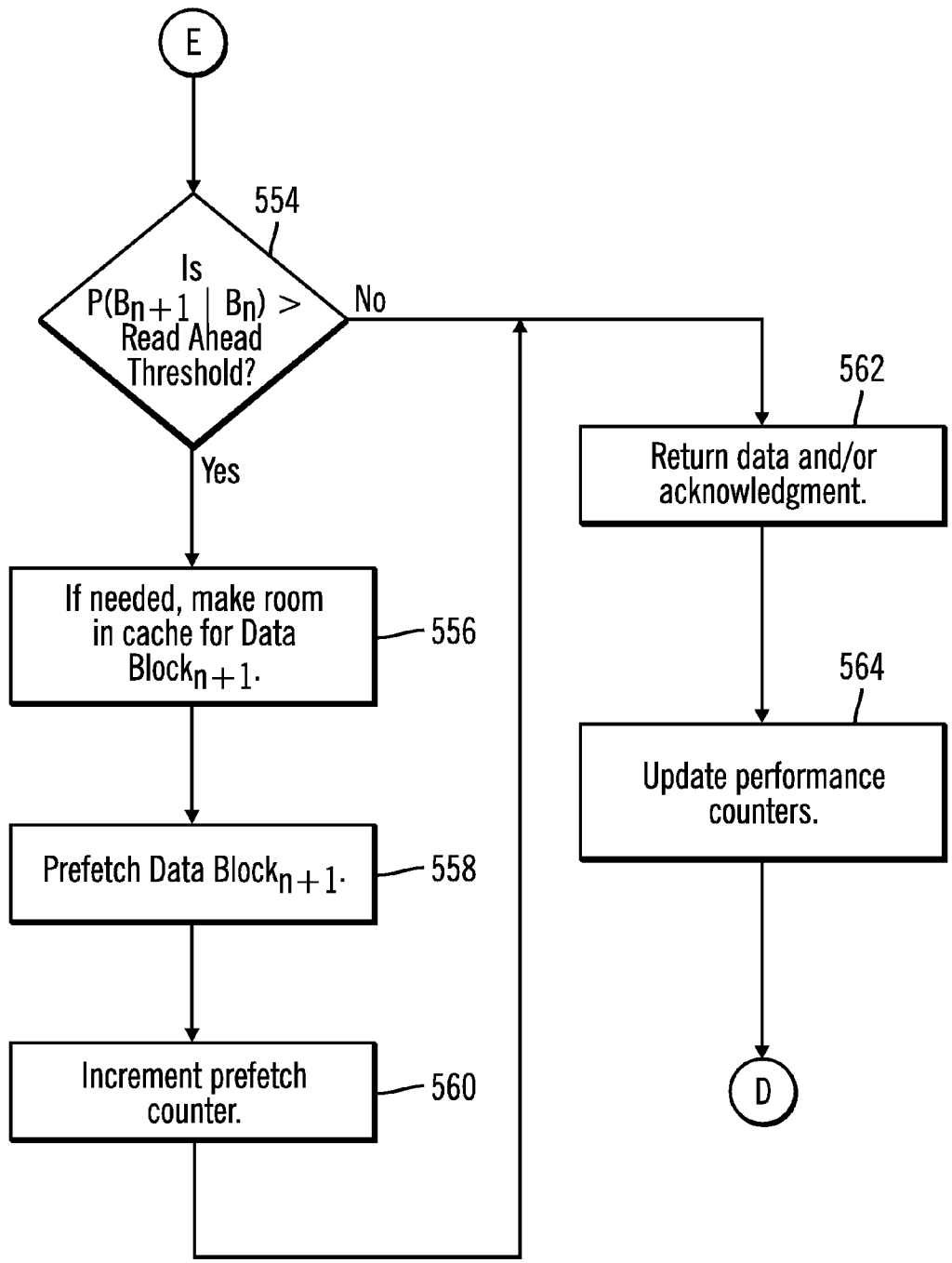
Figure 5E:
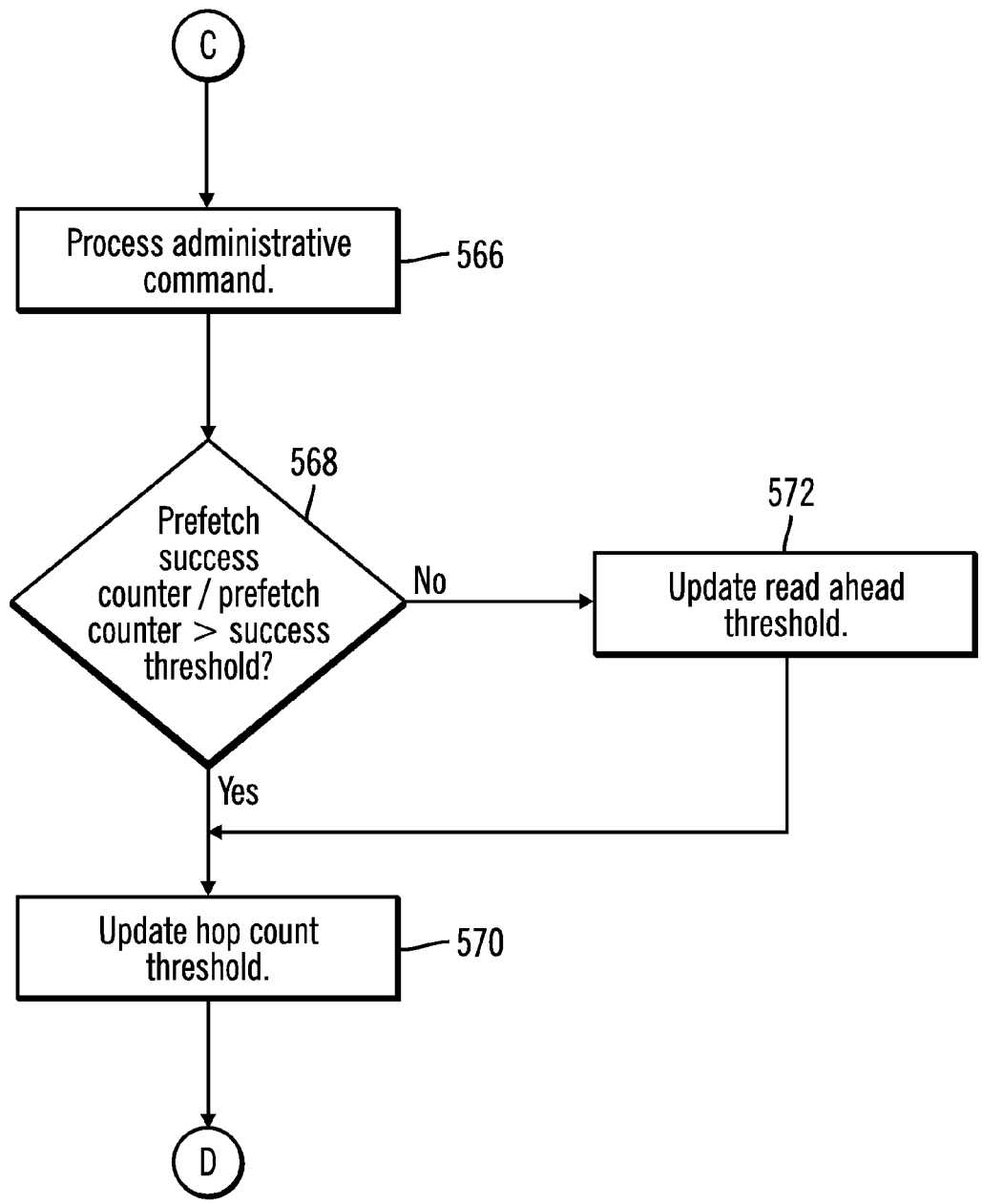

In FIGS. 5C and 5D, a read request is processed. In block 536, the cache management agent 256 updates the value of $P(B_n)$. In block 538, the cache management agent 256 determines whether the requester hop count is greater than a hop count threshold. If so, processing continues to block 540, otherwise, processing continues to block 542. The requester refers to the computing device or application from which the read request was received. The hop count threshold identifies a distance, and, when a requester's hop count is larger than the hop count threshold, the request from the requester is promoted in a request data structure (e.g., a queue) that stores requests for processing (block 540).

A request is promoted in the request data structure because the serial nature of the I/O processor 210 is such that the request may possibly engender an I/O operation to the storage device sooner if the request is at earlier in the data structure (e.g., at the head of a queue or near the head of the queue). This quality of service differentiation reflects the I/O processor 210 attempting to give the most distant initiator best service.

In block 542, the cache management agent 256 determines whether Data Block$_n$ is in cache 216. If so, processing continues to block 544, otherwise, processing continues to block 550. In block 544, the cache management agent 256 replies to the requester with Data Block$_n$ from cache 216. In block 546, the cache management agent 256 determines whether Data Blockn was previously prefetched into cache 216. If so, processing continues to block 548, otherwise, processing continues to block 554 (FIG. 5D). In block 548, the cache management agent 256 increments a prefetch success counter to indicate that a data block that had been previously prefetched was accessed.

In block 550, since Data Blockn is not in cache 216, the cache management agent 256 makes room in cache 216, if needed, for Data Blockn. In block 552, the cache management agent 256 issues a read request for Data Blockn to a storage device 230. From block 552, processing continues to block 554 (FIG. 5E).

In FIG. 5E, in block 554, the cache management agent 256 determines whether the probability that Data Block$_{n+1}$ may be accessed because Data Block$_n$ was accessed (i.e., $P(B_{n+1}|B_n)$) is greater than a read ahead threshold. If so, processing continues to block 556, otherwise, processing continues to block 562.

In block 556, the cache management agent 256 makes room in cache 216, if needed (See FIG. 6), for Data Block$_{n+1}$. In block 558, the cache management agent 256 prefetches Data Block$_{n+1}$. In block 560, the cache management agent 256 increments a prefetch counter.

In block 562, the cache management agent 256 returns data and/or an acknowledgement. In block 564, the cache management agent 256 updates performance counters.

In FIG. 5E, in block 566, an administrative command is processed. In block 568, the cache management agent 256 determines whether the prefetch success counter divided by a prefetch counter is greater than a success threshold. That is, the cache management agent 256 determines whether a percentage of times a prefetched data block was accessed exceeds a success threshold. If so, processing continues to block 570, otherwise, processing continues to block 572. In block 572, the cache management agent 256 updates the read ahead threshold and processing continues to block 570. In block 570, the cache management agent 256 updates a hop count threshold based on, for example, access statistics (e.g., a number of write requests versus read requests that were received during a certain period of time). From block 570, processing continues to block 508 (FIG. 5A). For example, a success threshold may be set at 60% (i.e., the prefetch strategy is considered successful if 60% of the read commands are able to access prefetched data blocks). The prefetch success counter is incremented each time a read command accesses a prefetched block of data. The prefetch counter is incremented each time a data block is prefetched into cache 216. Then, if the prefetch success counter/prefetch counter is greater than the success threshold, then the current prefetch strategy is determined to be successful. On the other hand, if the prefetch success counter/prefetch counter is not greater than the success threshold, the read ahead threshold is adjusted so that fewer data blocks are prefetched.

Thus, the I/O processor 210 maintains a hop count threshold, a read ahead threshold, and a success threshold. Based on how successful a previous caching policy has been with respect to the success threshold, the hop count threshold and, possibly, the read ahead threshold may be dynamically updated. The hop count threshold may be dynamically updated based upon observed access patterns. In certain embodiments, a default set of set thresholds may be programmed into the device in the manufacturing environment.

Figure 7:
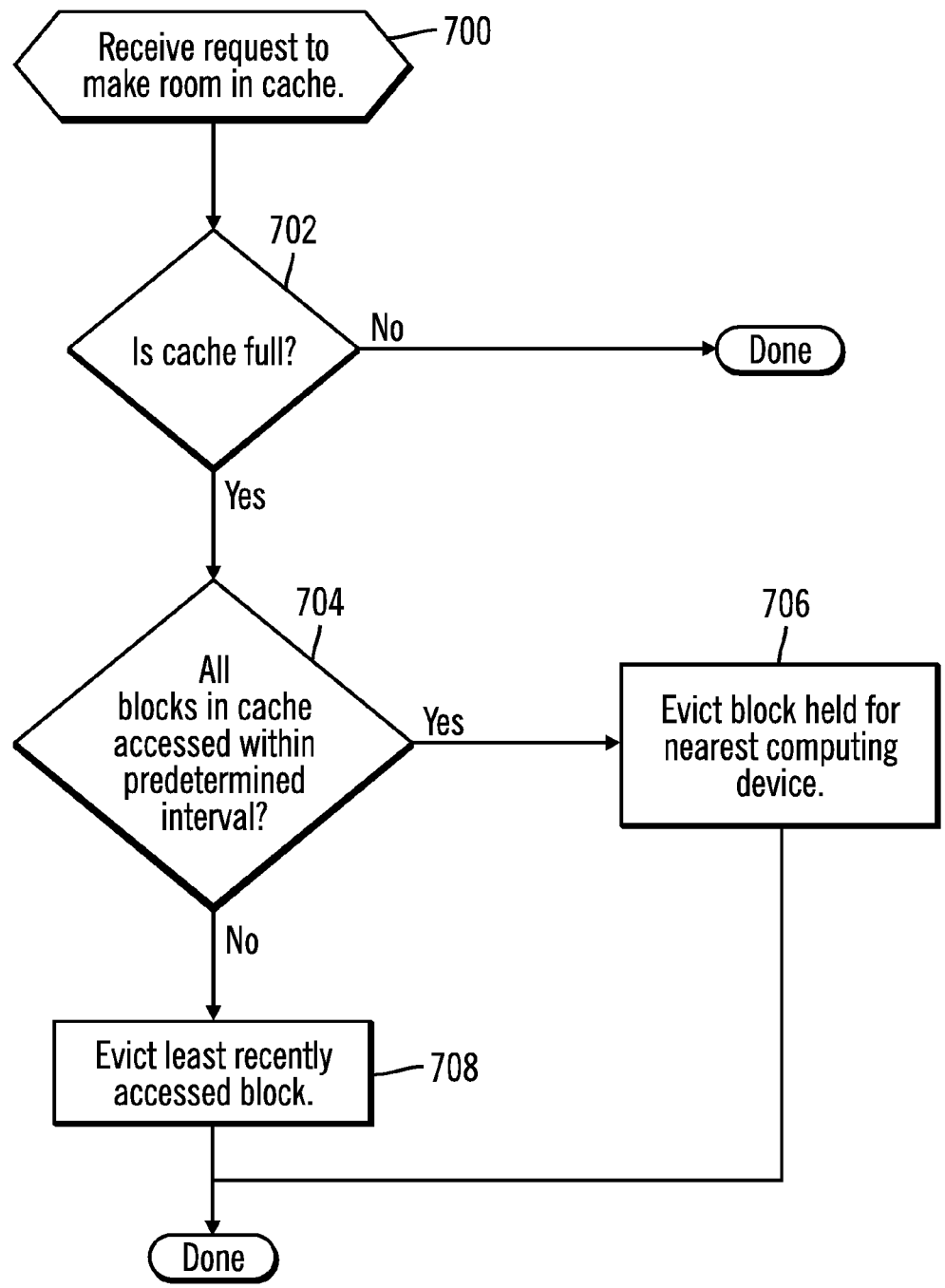
FIG. 7 illustrates operations performed to make room in cache for a data block in accordance with certain embodiments.

FIG. 7 illustrates operations performed to make room in cache 216 for a data block in accordance with certain embodiments. In block 700, the cache management agent 256 receives a request to make room in cache 216. In block 702, the cache management agent 256 determines whether the cache 216 is full. If the cache 216 is full, processing continues to block 704, otherwise, processing is done. In block 704, the cache management agent 256 determines whether all data blocks in cache 216 have been accessed within a predetermined interval (e.g., within the last 70 seconds). If so, processing continues to block 706, otherwise, processing continues to block 708. In block 706, the cache management agent 256 evicts a data block held for the nearest computing device (e.g., client) and processing is done. In block 708, the cache management agent 256 evicts a least recently accessed data block.

Certain embodiments use frequency-based, prior information, and network vector distances to serve clients across unpredictable networks. Also, certain embodiments rely on the I/O processor 210, which has significant computational and storage capabilities, to implement in-situ learning techniques, such as Bayesian networks and traffic modeling. This information is used, for example, to update the hop threshold.

Thus, in certain embodiments, the cache management agent 256 is able to learn about access patterns. The access patterns may be expressed by probability (i.e., of all of the I/O requests, which percentage are the given I/O request). Prior probabilities (i.e., the probability of I/O request X given a preceding I/O request Y, e.g., $P(X|Y)$) are also maintained. This learning is used to direct the pre-fetching behavior.

Additionally, certain embodiments track the identity of different requesters. The requesters with the furthest distance (e.g., as measured by Round-Trip-Time (RTT) expressed in hop-counts or startup calibration/pings). Then, the cache management agent 256 promotes requests from the furthest requesters to earlier (e.g., the beginning or near the beginning) in the request data structure.

Certain embodiments integrate network dynamics, computing device learning for access patterns, and other statistical techniques to have a dynamic caching policy that can adjust to workload and heterogeneous client network delays. That is, certain embodiments provide a caching policy that is self-tuning and adaptive.

Certain embodiments enable the storage devices 230 to become self-healing, self-adapting systems, in a manner consistent with the autonomic computing. Also, certain embodiments supports network delay metrics and access pattern learning in order to provide optimum request dynamics.

Certain embodiments also allow efficient performance from the I/O processor 210 by effectively utilizing the I/O processor 210 bandwidth by continually measuring and acting upon observed traffic patterns.

Intel, XScale and Xeon are registered trademarks and/or common law marks of Intel Corporation in the United States and/or foreign countries. Windows is a registered trademark and/or common law mark of Microsoft Corporation in the United States and/or foreign countries.

Additional Embodiment Details

The described techniques for adaptive caching may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art recognize that many modifications may be made to this configuration without departing from the scope of embodiments, and that the article of manufacture may comprise any information bearing medium known in the art.

The illustrated logic of FIGS. 5A, 5B, 5C, 5D, 5E, and 7 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

Figure 8:
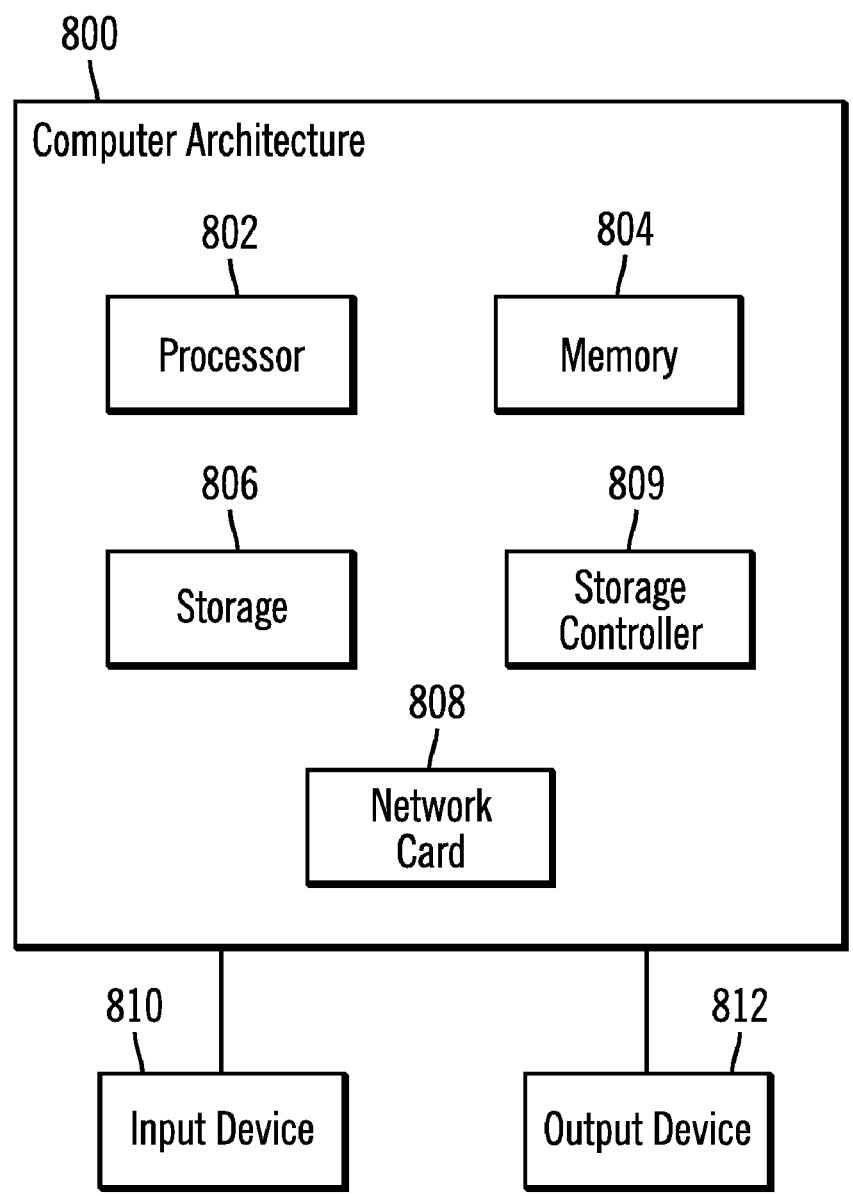
FIG. 8 illustrates one embodiment of a computer system.

FIG. 8 illustrates one embodiment of computer system 800, such as for computing devices 102a, 102b, 102c, 102d, 102d, 103, and/or 200. The system 800 may include a processor 802 (e.g., a microprocessor), a memory 804 (e.g., a volatile memory device), and storage 806 (e.g., a non-volatile storage, such as magnetic disk drives, optical disk drives, a tape drive, etc.). The storage 806 may comprise an internal storage device or an attached or network accessible storage. Programs in the storage 806 are loaded into the memory 804 and executed by the processor 802 in a manner known in the art. The system further includes a network card 808 to enable communication with a network, such as an Ethernet, a Fibre Channel Arbitrated Loop, etc. Further, the system may, in certain embodiments, include a storage controller 809. As discussed, certain of the network devices may have multiple network cards. An input device 810 is used to provide user input to the processor 802, and may include a keyboard, mouse, pen-stylus, microphone, touch sensitive display screen, or any other activation or input mechanism known in the art. An output device 812 is capable of rendering information transmitted from the processor 802, or other component, such as a display monitor, printer, storage, etc.

The foregoing description of various embodiments has been presented for the purposes of illustration and description. It is not intended to be exhaustive or to limit the embodiments to the precise forms disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments can be made without departing from the spirit and scope of the embodiments, the embodiments reside in the claims hereinafter appended.

What is claimed is:

1. A method for cache management, comprising:
receiving an incoming request to access a first data block, wherein the incoming request is one of a read request and a write request;
determining a probability of how likely a second data block may be accessed based on the access of the first data block, wherein the probability is determined using a Bayesian networks technique;
determining whether the probability exceeds a read ahead threshold;
prefetching the second data block in response to determining that the probability exceeds the read ahead threshold;
receiving an administrative command; and
in response to receiving the administrative command,
determining whether a percentage of times a prefetched data block was accessed exceeds a success threshold;
in response to determining that the percentage does not exceeds the success threshold, updating the read ahead threshold so that fewer data blocks are prefetched upon receiving additional incoming requests to access data block; and
updating a hop count threshold, wherein the hop count threshold identifies a distance, wherein the hop count threshold is updated based on access statistics including a number of write requests versus read requests that were received during a certain period of time, and wherein the Bayesian networks technique is used to learn access patterns.

2. The method of claim 1, further comprising:
determining whether a hop count associated with the first data block is greater than the hop count threshold; and
promoting the read request to a different position in a request data structure in response to determining that the hop count is greater than the hop count threshold.

3. The method of claim 1, further comprising:
updating a probability that the first data block may be accessed.

4. The method of claim 1, further comprising:
updating a prefetch counter when prefetching the second data block.

5. The method of claim 1, wherein the incoming request is a write request and further comprising:
caching the first data block;
committing the write request to a storage device; and
sending acknowledgement that the write request has been committed.

6. The method of claim 5, further comprising:
writing the first data block to the storage device after committing the write request.

7. The method of claim 1, further comprising:
determining that a data block is to be evicted from cache;
determining whether data blocks currently in the cache have been accessed within a predetermined interval;
evicting a data block in the cache that is held for a nearest computing device in response to determining that the data blocks have been accessed within the predetermined interval; and
evicting a data block in cache that has least recently been accessed in response to determining that at least one data block has not been accessed within the predetermined interval.

8. The method of claim 7, wherein the determination of which computing device is a nearest computing device is based on a hop count associated with a request from that computing device.

9. The method of claim 1, wherein the incoming request is a read request further comprising:
determining whether the first data block is in cache;
determining whether the first data block was previously prefetched in response to determining that the first data block is in cache; and
incrementing a prefetch success counter in response to determining that the first data block was previously prefetched.

10. A system in communication with data storage, comprising:
a computing device with an input/output (I/O) processor;
a storage controller capable of managing input/output (I/O) access to the data storage, wherein the data storage controller is coupled to the computing device; and
a cache management agent at the computing device, wherein the cache management agent is capable of receiving an incoming request to access a first data block, wherein the incoming request is one of a read request and a write request, determining a probability of how likely a second data block may be accessed based on the access of the first data block, wherein the probability is determined using a Bayesian networks technique, determining whether the probability exceeds a read ahead threshold, prefetching the second data block in response to determining that the probability exceeds the read ahead threshold, receiving an administrative command, and, in response to receiving the administrative command, determining whether a percentage of times a prefetched data block was accessed exceeds a success threshold, updating the read ahead threshold in response to determining that the percentage does not exceed the success threshold so that fewer data blocks are prefetched upon receiving additional incoming requests to access data blocks, and updating a hop count threshold, wherein the hop count threshold identifies a distance, wherein the hop count threshold is updated based on access statistics including a number of writes versus read requests that were received during a certain period of time, and wherein the Bayesian networks technique is used to learn access patterns.

11. The system of claim 10, wherein the cache management agent is capable of determining whether the hop count associated with the first data block is greater than a hop count threshold and promoting the read request to a different position in a request data structure in response to determining that the hop count is greater than the hop count threshold.

12. The system of claim 10, wherein the cache management agent is capable of updating a probability that the first data block may be accessed.

13. The system of claim 10, wherein the cache management agent is capable of updating a prefetch counter when prefetching the second data block.

14. The system of claim 10, wherein the incoming request is a write request and wherein the cache management agent is capable of caching the first data block, committing the write request to a storage device, and sending acknowledgement that the write request has been committed.

15. The system of claim 14, wherein the cache management agent is capable of writing the first data block to the storage device after committing the write request.

16. The system of claim 10, wherein the cache management agent is capable of determining that a data block is to be evicted from cache, determining whether data blocks currently in the cache have been accessed within a predetermined interval, evicting a data block in the cache that is held for a nearest computing device in response to determining that the data blocks have been accessed within the predetermined interval, and evicting a data block in cache that has least recently been accessed in response to determining that at least one data block has not been accessed within the predetermined interval.

17. The system of claim 16, wherein the determination of which computing device is a nearest computing device is based on a hop count associated with a request from that computing device.

18. The system of claim 10, wherein the incoming request is a read request and wherein the cache management agent is capable of determining whether the first data block is in cache, determining whether the first data block was previously prefetched in response to determining that the first data block is in cache, and incrementing a prefetch success counter in response to determining that the first data block was previously prefetched.

19. An article of manufacture, embodied as a computer readable storage medium having stored therein instructions that when executed by a computing device results in the following:
receiving an incoming request to access a first data block, wherein the incoming request is one of a read request and a write request;
determining a probability of how likely a second data block may be accessed based on the access of the first data block, wherein the probability is determined using a Bayesian networks technique;
determining whether the probability exceeds a read ahead threshold;
prefetching the second data block in response to determining that the probability exceeds the read ahead threshold;
receiving an administrative command; and
in response to receiving the administrative command,
determining whether a percentage of times a prefetched data block was accessed exceeds a success threshold;
updating the read ahead threshold in response to determining that the percentage does not exceed the success threshold so that fewer data blocks are prefetched upon receiving additional incoming requests to access data blocks; and
updating a hop count threshold, wherein the hop count threshold identifies a distance, wherein the hop count threshold is updated based on access statistics including a number of write requests versus read requests that were received during a certain period of time, and wherein the Bayesian networks technique is used to learn access patterns.

20. The article of manufacture of claim 19, wherein the instructions when executed further result in the following:
   determining whether a hop count associated with the first data block is greater than the hop count threshold; and
   promoting the read request to a different position in a request data structure in response to determining that the hop count is greater than the hop count threshold.

21. The article of manufacture of claim 19, wherein the instructions when executed further result in the following:
   updating a probability that the first data block may be accessed.

22. The article of manufacture of claim 19, wherein the instructions when executed further result in the following:
   updating a prefetch counter when prefetching the second data block.

23. The article of manufacture of claim 19, wherein the incoming request is a write request and wherein the instructions when executed further result in the following:
   caching the first data block;
   committing the write request to a storage device; and
   sending acknowledgement that the write request has been committed.

24. The article of manufacture of claim 23, wherein the instructions when executed further result in the following:
   writing the first data block to the storage device after committing the write request.

25. The article of manufacture of claim 19, wherein the instructions when executed further result in the following:
   determining that a data block is to be evicted from cache;
   determining whether data blocks currently in the cache have been accessed within a predetermined interval;
   evicting a data block in the cache that is held for a nearest computing device in response to determining that the data blocks have been accessed within the predetermined interval; and
   evicting a data block in cache that has least recently been accessed in response to determining that at least one data block has not been accessed within the predetermined interval.

26. The article of manufacture of claim 25, wherein the determination of which computing device is a nearest computing device is based on a hop count associated with a request from that computing device.

27. The article of manufacture of claim 19, wherein the incoming request is a read request and wherein the instructions when executed further result in the following:
   determining whether the first data block is in cache;
   determining whether the first data block was previously prefetched in response to determining that the first data block is in cache; and
   incrementing a prefetch success counter in response to determining that the first data block was previously prefetched.

* * * * *

UNITED STATES PATENT AND TRADEMARK OFFICE
CERTIFICATE OF CORRECTION

| | | |
|---|---|---|
| PATENT NO. | : 7,353,339 B2 | Page 1 of 1 |
| APPLICATION NO. | : 10/746051 | |
| DATED | : April 1, 2008 | |
| INVENTOR(S) | : Eshwari P. Komarla et al. | |

It is certified that error appears in the above-identified patent and that said Letters Patent is hereby corrected as shown below:

Column 10, Line 34, delete "exceeds" and replace with --exceed--.

Column 10, Line 37, delete "block" and replace with --blocks--.

Column 11, Line 28, delete "input/output" and replace with --Input/Output--.

Column 11, Line 29, delete "input/output" and replace with --Input/Output--.

Column 11, Line 56, delete "writes" and replace with --write requests--.

Signed and Sealed this

Twenty-second Day of December, 2009

David J. Kappos
*Director of the United States Patent and Trademark Office*